May 22, 1962 K. L. SICHERMAN 3,035,671
PORTABLE FOLDING STEPS
Filed Jan. 19, 1961 3 Sheets-Sheet 1

INVENTOR.
KARL L. SICHERMAN
BY
ATTORNEY

May 22, 1962 K. L. SICHERMAN 3,035,671
PORTABLE FOLDING STEPS

Filed Jan. 19, 1961 3 Sheets-Sheet 2

*INVENTOR.*
KARL L. SICHERMAN
BY
ATTORNEY

May 22, 1962 K. L. SICHERMAN 3,035,671
PORTABLE FOLDING STEPS
Filed Jan. 19, 1961 3 Sheets-Sheet 3
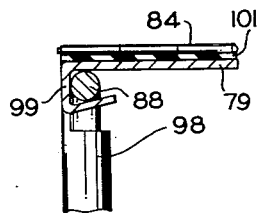
FIG. 19
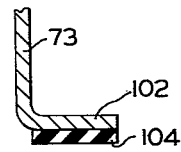
FIG. 20
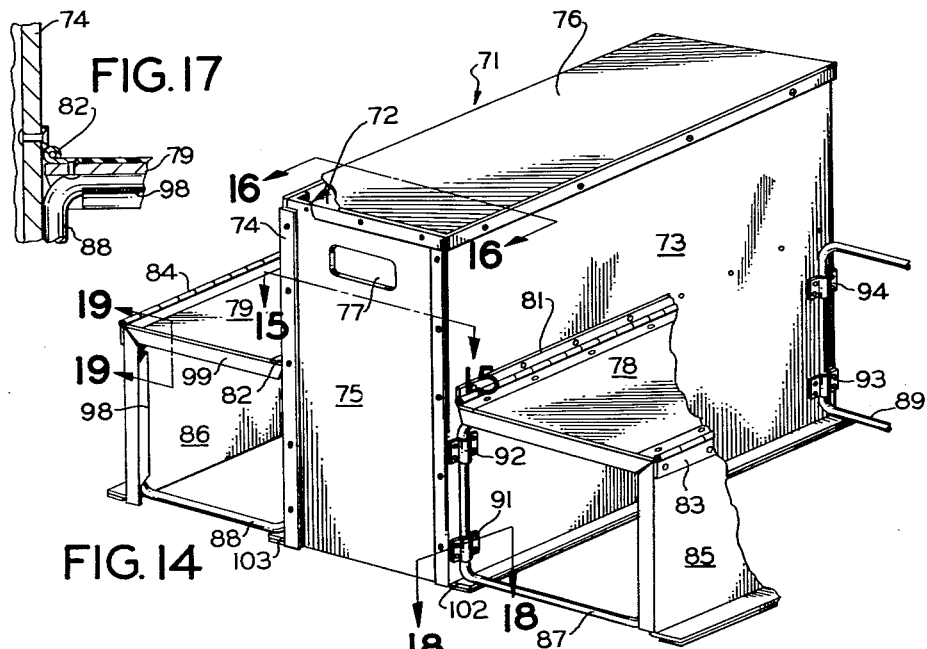
FIG. 17
FIG. 14
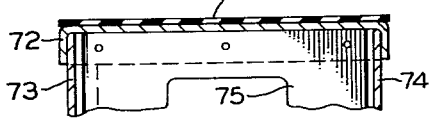
FIG. 16
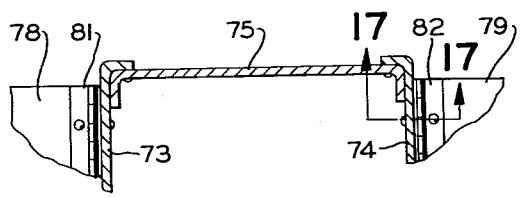
FIG. 15
FIG. 18
*INVENTOR.*
KARL L. SICHERMAN
BY
ATTORNEY

United States Patent Office 3,035,671
Patented May 22, 1962

3,035,671
PORTABLE FOLDING STEPS
Karl L. Sicherman, 5408 Sylvia Ave.,
Los Angeles, Calif.
Filed Jan. 19, 1961, Ser. No. 83,729
3 Claims. (Cl. 189—43)

This invention relates to portable and foldable steps and more particularly to a portable and foldable set of steps for use in conjunction with an electro-cardiographic exercise test and which may be conveniently used and compactly stored in a minimum of space in a doctor's office.

A two-step exercise test has been developed for use in conjunction with electro-cardiographic recordings in which the patient is required to climb up one side and down the other side of the standard set of steps to simulate stair climbing, a natural form of exercise. These steps consist of two steps nine inches wide and nine inches from the floor arranged on both sides of a central step nine inches wide and eighteen inches from the floor. The steps are placed adjoining a wall and the patient instructed to climb up one side of the steps and down the other side, turn around in the direction of the wall, and repeat the procedure until the specified number of trips have been completed in a particular period of time.

Obviously, sets of this nature solidly and rigidly constructed would take up considerable space in a doctor's office, and could not be conveniently moved or stored in a compact space.

In one preferred embodiment of the present invention, a set of steps is formed by a central box-like structure which is provided with folding steps hingedly mounted on opposite sides thereof, and supported by pivotally mounted braces which can be collapsed along the side of the box when the steps are folded over the top of the central box-like structure.

One object of the present invention is to provide a set of standard steps for electro-cardiographic exercise tests which may be readily and conveniently moved from one place to another and compactly stored when in the folded or collapsed position.

Other objects and advantages of the present invention will be apparent from the following specification and claims taken in conjunction with the drawings wherein:

FIGURE 14 is a pictorial view with the portions broken away and illustrating another preferred embodiment of the present invention;

FIGURE 15 is a detailed sectional view taken on the line 15—15 of FIGURE 14;

FIGURE 16 is a detailed sectional view taken on the line 16—16 of FIGURE 14;

FIGURE 17 is a detailed sectional view taken on the line 17—17 of FIGURE 15;

FIGURE 18 is a detailed sectional view taken on the line 18—18 of FIGURE 14; and illustrating another hinge construction for the step braces;

FIGURE 19 is a detailed sectional view taken on the line 19—19 of FIGURE 14 and illustrating the resilient spring clips integrally formed in the step structure to retain the step braces in extended position;

FIGURE 20 is a detailed sectional view taken on the line 20—20 of FIGURE 18.

Figure 1:
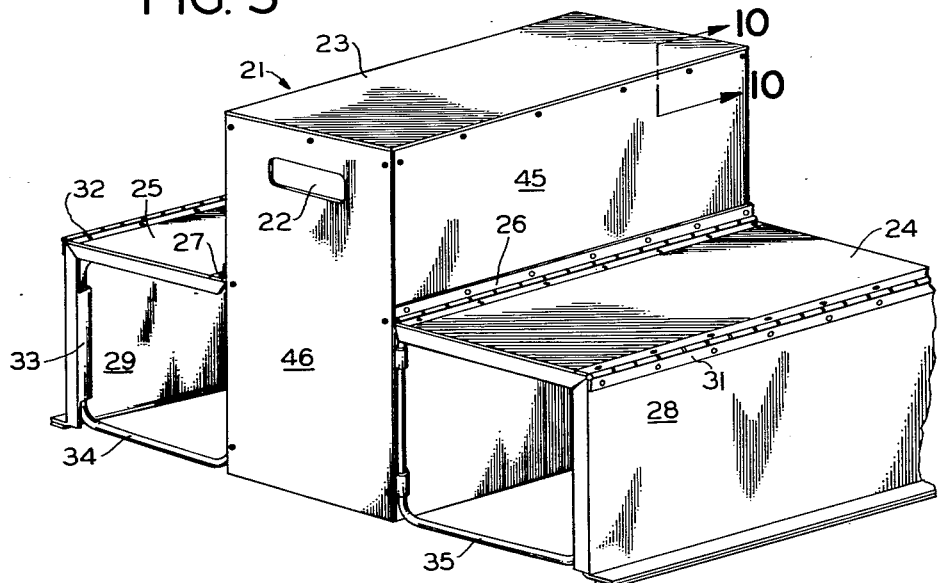
FIGURE 1 is a pictorial view illustrating one preferred embodiment of the present invention in its extended form and ready for use by the patient.

Referring now to the drawings in detail and more particularly to FIGURES 1 through 6, the portable and foldable steps of one preferred embodiment of the present invention are illustrated in an extended position in FIGURE 1 with a central box-like structure 21 provided with openings 22 at opposite ends thereof by which the device may be lifted and moved when desired. The central box-like structure 21 which forms the central step is preferably provided with a suitable covering such as a non-skid plastic matting or carpet 23.

The two side steps 24 and 25 are pivotally mounted by a suitable means such as the piano hinges 26 and 27 on the side walls 44 and 45 of the central step 21.

The steps 24 and 25 are each provided with vertical risers 28 and 29 which are pivotally connected thereto along the outer edge thereof by suitable means such as the piano hinges 31 and 32.

The risers 28 and 29, and the steps 24 and 25, are provided with a plurality of spring clips which may be integrally formed on inward projecting flanges along the ends thereof, each as the spring clip 33 which engages the step brace 34, as illustrated in FIGURE 1. Another step brace 35 will also engage a similar clip 41 on the riser 28 as well as clip 38 on the step 24, as illustrated in FIGURE 3.

Figure 3:
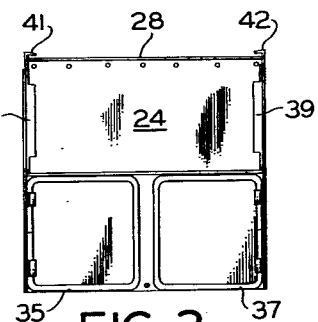
FIGURE 3 is a side view of the folded steps illustrated in FIGURE 2.
Figure 4:
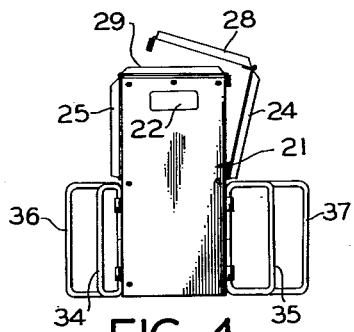
FIGURE 4 is a view of the folding steps of FIGURES 2 and 3 with the step braces partially extended and one of the folding steps slightly moved from its storage position.

FIGURE 4 illustrates the other leg braces 36 and 37, and FIGURE 3 illustrates the resilient spring clips 38 and 39 on step 24 and the spring clips 41 and 42 which are formed on the riser 28. Two remaining spring clips on the ends of the step 25 and the riser 29 are not shown.

The steps 24 and 25 are also preferably covered with a non-skid plastic matting or carpet similar to the matting 23 on the central step 21.

Figure 2:
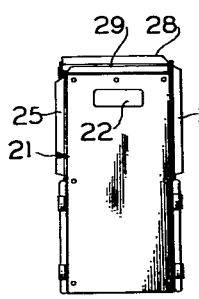
FIGURE 2 is an end view on a smaller scale illustrating the foldable steps of FIGURE 1 in the folded and compact position.
Figures 5, 6:
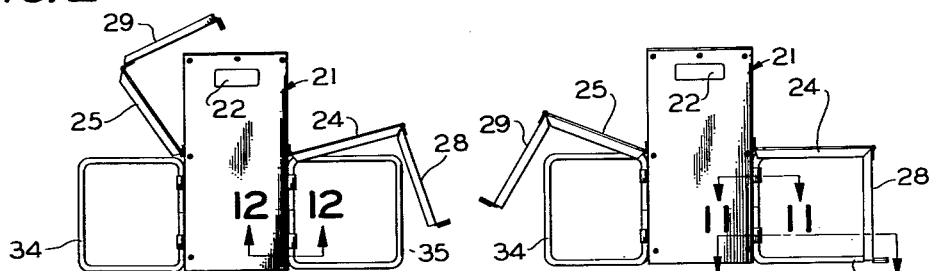
FIGURE 5 is a view similar to FIGURE 4 with the step braces fully extended and both steps partially moved from their storage position.
FIGURE 6 is another view similar to FIGURES 4 and 5 but illustrating one of the steps in the fully extended position and the other step in the position just prior to its final position illustrated in FIGURE 1.

FIGURES 2 and 3 illustrate the steps of the present invention in its folded compact form for storage, and FIGURES 4, 5 and 6 illustrate the successive steps in opening the leg braces 34, 35, 36 and 37 to the fully extended position shown in FIGURE 5 and the manner in which the steps and risers are sequentially unfolded and the leg braces engaged by the spring clips to form a rigid and secure assembled structural relationship as shown in FIGURE 1.

Figure 7:
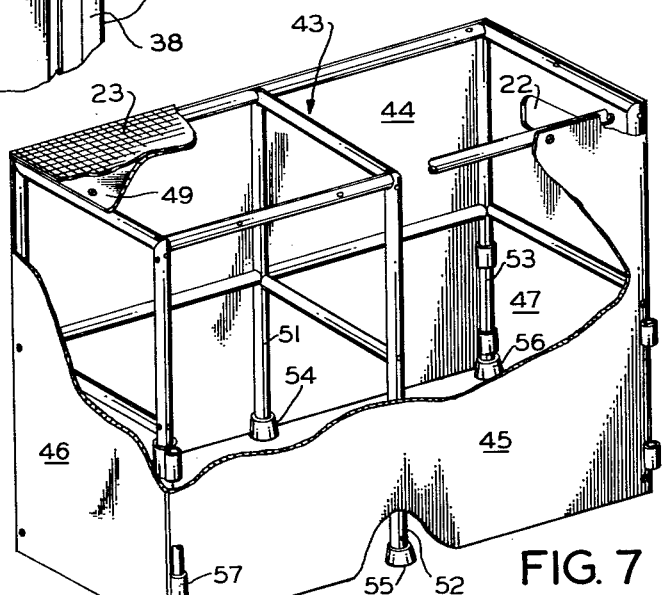
FIGURE 7 is a pictorial view with portions broken away to illustrate internal details of construction and particularly the tubular framework supporting the external covering of the central step.
Figure 12:
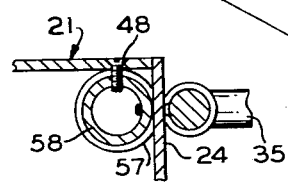
FIGURE 12 is an enlarged detailed sectional view taken on the line 12—12 of FIGURE 5.

FIGURES 7 through 13 illustrate various structural details of the steps of FIGURE 1 on an enlarged scale. FIGURE 7 particularly illustrates the tubular framework 43 to which the side walls 44 and 45 and the end walls 46 and 47 are secured as by screws 48, as illustrated in FIGURE 12, or by other suitable means such as spot welding. Another panel 49 is suitably secured to the top of the tubular framework and a portion of this panel is illustrated in FIGURE 7 and is covered by the plastic matting 23 so that it does not show in the other views.

Figure 11:
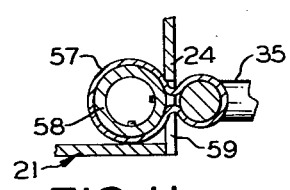
FIGURE 11 is a detailed sectional view on an enlarged scale of the hinge arrangement for the step braces taken on the line 11—11 of FIGURE 6.
Figure 8:
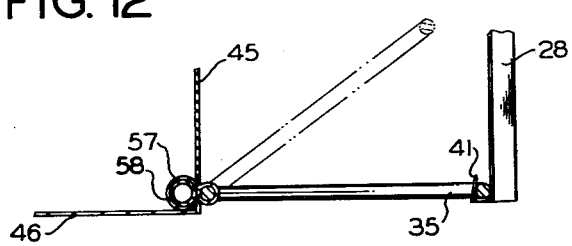
FIGURE 8 is a detailed view on an enlarged scale taken on the line 8—8 of FIGURE 6.

The lower ends of the tubular framework form legs such as those illustrated in FIGURE 7 at 51, 52 and 53 which may be provided with rubber non-skid cups 54, 55 and 56 to prevent the steps from moving when in use. FIGURES 8, 11 and 12 illustrate one particular manner of pivotally mounting the leg braces such as the brace 35 by means of a double sleeve integrally formed in the figure-8-shape as indicated at 57 and having one loop of the sleeve wrapped around one of the legs 58 of the tubular framework and the other loop wrapped around the rectangular tubular leg brace 35 with the intermediate portion of the sleeve extending through a slot 59 in the side wall 45. The manner in which the leg brace 35 is engaged by the resilient spring clip 38 integrally formed on the riser 28, will be quite apparent from the view in FIGURE 8.

Figure 9:
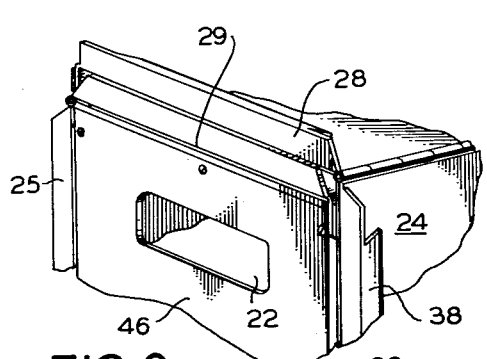
FIGURE 9 is a detailed pictorial view on an enlarged scale illustrating a portion of the central step with the side steps folded over in the storage position.

FIGURE 9 illustrates some details of the overlapping of riser 28 on top of riser 29 in the folded position with the steps 24 and 25 lying flat against the sides 44 and 45 of the central step 21. It will be apparent that step 24 must be slightly longer than step 25 and riser 28 must be slightly longer than riser 29 in order to provide a snug overlapping relationship of these elements in the folded position.

Figure 10:
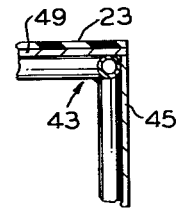
FIGURE 10 is an enlarged detail taken on the line 10—10 of FIGURE 1.

FIGURE 10 illustrates one detail of a corner of the tubular framemork 43 with the side wall 45 and the top panel 49 with its plastic covering 23 secured together.

Figure 13:
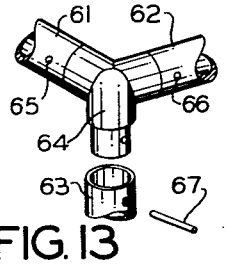
FIGURE 13 is an enlarged detail view illustrating one particular way in which the tubing may be joined at one corner of the tubular framework illustrated in FIGURE 7.

FIGURE 13 illustrates on an enlarged scale one particular manner in which the tubular framework can be joined at the corner wherein the tubular elements 61, 62 and 63 may be joined to a tubular corner coupling 64 by a variety of means such as the pins 65, 66 and 67, swaging, drive tapering or screw threading.

It will be apparent that the tubular framework 43 may be formed of any suitable rigid tubular material such as steel or aluminum tubing and the side and end walls 44, 45, 46 and 47, as well as the top panel 49, may be formed of any suitable sheet material such as sheet aluminum, sheet steel or hardboard having sufficient strength. The leg braces 34, 35, 36 and 37 may be formed of steel or aluminum tubing or solid rods, as illustrated.

One modification and another preferred embodiment of the present invention is illustrated in FIGURES 14 through 20, wherein the center step 71 is formed of heavier panels secured together to form a rigid box-like structure without a tubular supporting framework.

In this case, a flanged top plate 72 is secured to the flanged side plates 73 and 74, as well as the end plates such as 75 by rivets, sheet metal screws, spot welds, or similar means which are also used to secure the side plates 73 and 74 to the end plates such as 75.

The top plate 72 is preferably covered with a non-skid plastic matting or carpet 76 to prevent slipping.

The end plates 75 are provided with an opening 77 to facilitate movement and storage of the folding steps as described above.

The side steps 78 and 79 are likewise pivotally mounted on the side plates 73 and 74 by suitable means such as the piano hinges 81 and 82 and are also provided with piano hinges 83 and 84 along their outer edges for pivotally mounting the risers 85 and 86. The details of construction of the box-like construction of the center step is clearly illustrated in the enlarged detailed sectional views of FIGURES 15 and 16.

The leg braces 87, 88 and 89 are pivotally mounted on the side plates 73 and 74 by means of hinge plates such as those illustrated at 91, 92, 93 and 94. This detail is clearly illustrated in FIGURE 18, wherein the hinge plate 91 is secured by suitable means such as the rivets 95 and 96 to the side plate 93 for pivotally mounting the leg brace 87.

FIGURE 17 illustrates the manner in which the leg brace 88 is engaged and held in position by the resilient spring clip 98 formed on the flange of the riser 86 to hold the step 79 and the riser 86 securely in their extended positions.

FIGURE 19 illustrates the manner in which the spring clip 99 formed on the step 79 engages the upper horizontal portion of the leg brace 88 and also shows a non-skid plastic matting or carpet 101 which may be provided on the step 79 as well as on the step 78 to prevent slipping. Similar clips (not shown) are also provided at opposite ends of both steps 78 and 79, as well as risers 85 and 86.

If desired, the bottom edge of the side plates or panels such as 73 may be flanged as indicated at 102 and 103 and provided with a strip of non-skid rubber or plastic 104 to hold the risers firmly in position, as indicated in the detail of FIGURE 20.

Obviously many other modifications and variations of the present invention may be made within the scope of the following claims.

What is claimed is:

1. Portable and foldable steps comprising a central box-like structure, a pair of steps each hingedly mounted on a horizontal axis along the central portion and on opposite sides of said box-like structure, a pair of risers each hingedly mounted along the outer edge of each of said steps, and a plurality of braces each pivotally mounted adjacent to one of the corners of said box-like structure on a vertical axis and adapted to fold inwardly against the lower portion of the sides of said box-like structure, resilient clip means on both ends of each of said steps and risers adapted to engage and secure said braces in their extended position, said steps being adapted to fold upwardly against the sides of said box-like structure and said risers being adapted to fold over the top of said box-like structure in overlapping relationship.

2. Portable and foldable steps as set forth in claim 1 wherein said central box-like structure is formed by a tubular framework with top and side and end panels secured thereto, and said braces are pivotally mounted by means of a plurality of double sleeves extending through said side panels and around respective leg braces and adjacent portions of said tubular framework.

3. Portable and foldable steps as set forth in claim 1 wherein said central box-like structure is formed by flanged top and side panels and end panels secured to each other and said braces are pivotally mounted on said side panels by means of hinge plates secured to said side panels.

No references cited.